US006856466B2

(12) United States Patent
Tocci

(10) Patent No.: US 6,856,466 B2
(45) Date of Patent: Feb. 15, 2005

(54) MULTIPLE IMAGING SYSTEM

(75) Inventor: Michael D. Tocci, Sandia Park, NM (US)

(73) Assignee: Science & Engineering Associates, Inc., Albuquerque, NM (US)

( * ) Notice: Subject to any disclaimer, the term of this patent is extended or adjusted under 35 U.S.C. 154(b) by 0 days.

(21) Appl. No.: 10/187,912

(22) Filed: Jul. 2, 2002

(65) Prior Publication Data

US 2003/0007254 A1 Jan. 9, 2003

Related U.S. Application Data

(60) Provisional application No. 60/303,243, filed on Jul. 5, 2001.

(51) Int. Cl.⁷ .......................... G02B 13/22; G02B 27/12
(52) U.S. Cl. ....................... 359/663; 359/640; 359/723; 359/740
(58) Field of Search ................................ 359/663, 639, 359/640, 738–740, 722–723, 891

(56) References Cited

U.S. PATENT DOCUMENTS

| | | |
|---|---|---|
| 3,720,146 A | 3/1973 | Yost, Jr. ...................... 95/12.2 |
| 4,072,405 A | 2/1978 | Ozeki ......................... 350/173 |
| 4,084,180 A | 4/1978 | Stoffels et al. ................ 358/55 |
| 4,134,683 A | 1/1979 | Goetz et al. ................. 356/407 |
| 4,141,625 A | 2/1979 | Pickar et al. ............... 350/171 |
| 4,268,119 A | 5/1981 | Hartmann .................... 350/173 |
| 4,272,684 A | 6/1981 | Seachman ................... 250/578 |
| 4,281,339 A | 7/1981 | Morishita et al. ............. 358/52 |
| 4,531,054 A | 7/1985 | Suzuki ........................ 250/201 |
| 4,573,195 A | 2/1986 | de France ...................... 382/6 |
| 4,650,321 A | 3/1987 | Thompson ................... 356/73 |
| 4,743,112 A | 5/1988 | Burke ......................... 356/326 |
| 4,746,798 A | 5/1988 | Amon et al. ................ 250/339 |
| 4,786,813 A | 11/1988 | Svanberg et al. ........ 250/461.1 |
| 4,916,529 A | 4/1990 | Yamamoto et al. ........... 358/50 |
| 4,933,751 A | 6/1990 | Shinonaga et al. ........... 358/55 |
| 5,024,530 A | 6/1991 | Mende ....................... 356/402 |
| 5,059,026 A | 10/1991 | Zoechbauer ................ 356/346 |
| 5,149,959 A | 9/1992 | Collins et al. .............. 250/226 |
| 5,153,621 A | 10/1992 | Vogeley ....................... 353/30 |
| 5,194,959 A | 3/1993 | Kaneko et al. ............. 358/225 |

(List continued on next page.)

FOREIGN PATENT DOCUMENTS

| | | | |
|---|---|---|---|
| JP | 09197263 A | 7/1997 | ........... G02B/13/00 |
| WO | WO 01/92940 A1 | 12/2001 | ............ G02B/3/08 |

OTHER PUBLICATIONS

Provisional application Ser. No. 60/303,243 filed Jul. 5, 2001 for "Multiple Imaging System;" Applicant: Michael D. Tocci.

*Primary Examiner*—Scott J. Sugarman
*Assistant Examiner*—Deborah Raizen
(74) *Attorney, Agent, or Firm*—Perkins Smith & Cohen LLP; Jacob N. Erlich; Orlando Lopez

(57) ABSTRACT

A series of optical elements is used to produce multiple simultaneous adjoining images on a single image plane. A first, intermediate, image is produced using the first telecentric imaging lens. This intermediate image is produced at a plane coincident with an adjustable-size rectangular field stop. The rectangular field stop is mounted in a sub-housing that allows its free rotation. A second telecentric lens collimates the light from the intermediate image. This collimated light is next passed through an optical splitting means, which uses the principal of refraction to separate the light into multiple components. The optical splitting means is mounted in a sub-housing that allows its free rotation. From here, the light next passes through a third and final lens, which produces a second, final, image on a single, planar detection device. The final image consists of a plurality of identical copies of the intermediate image.

35 Claims, 11 Drawing Sheets

U.S. PATENT DOCUMENTS

| | | | |
|---|---|---|---|
| 5,216,484 A | 6/1993 | Chao et al. | 356/326 |
| 5,225,888 A | 7/1993 | Selwyn et al. | 356/346 |
| 5,225,893 A | 7/1993 | Whitney et al. | 356/407 |
| 5,251,008 A | 10/1993 | Masutani | 356/346 |
| 5,260,767 A | 11/1993 | Cook | 356/326 |
| 5,276,321 A | 1/1994 | Chang et al. | 250/226 |
| 5,414,458 A | 5/1995 | Harris et al. | 348/92 |
| 5,461,477 A | 10/1995 | Marinelli et al. | 356/352 |
| 5,479,015 A | 12/1995 | Rudman et al. | 250/332 |
| 5,526,119 A | 6/1996 | Blit et al. | 356/402 |
| 5,539,483 A | 7/1996 | Nalwa | 353/94 |
| 5,561,521 A | 10/1996 | Chase et al. | 356/346 |
| 5,587,784 A | 12/1996 | Pines et al. | 356/4.01 |
| 5,642,191 A | 6/1997 | Mende | 356/326 |
| 5,729,011 A | 3/1998 | Sekiguchi | 250/226 |
| 5,926,283 A | 7/1999 | Hopkins | 356/419 |
| 6,016,224 A | 1/2000 | Namiki | 359/619 |
| 6,031,619 A | 2/2000 | Wilkens et al. | 356/419 |
| 6,172,813 B1 * | 1/2001 | Tadic-Galeb et al. | 359/618 |
| 6,222,631 B1 | 4/2001 | Terauchi | 356/419 |
| 6,304,330 B1 | 10/2001 | Millerd et al. | 356/521 |
| 6,384,969 B1 | 5/2002 | Kanai et al. | 359/431 |
| 6,392,816 B1 | 5/2002 | Hamano | 359/683 |
| 6,441,972 B1 | 8/2002 | Lesniak et al. | 359/741 |
| 6,472,657 B1 * | 10/2002 | Miles et al. | 250/231.15 |

* cited by examiner

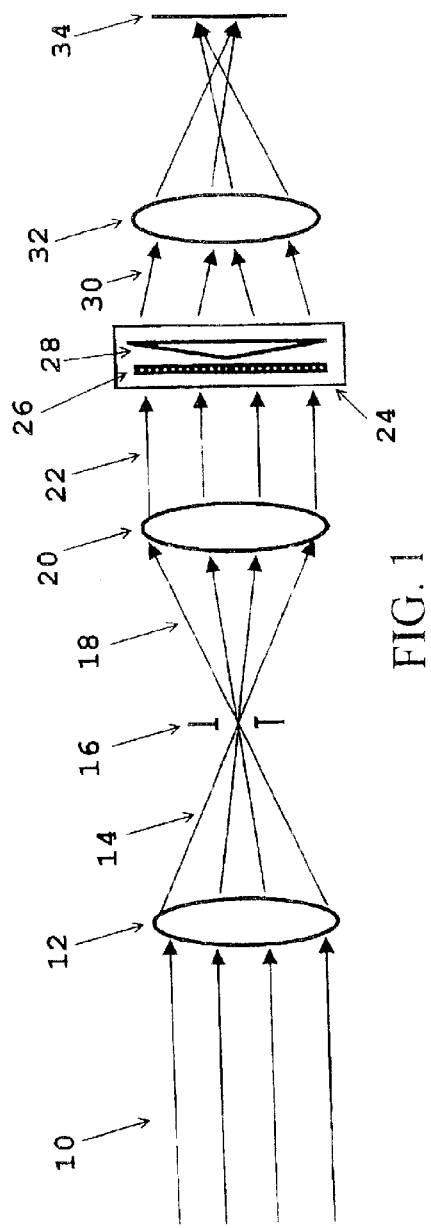
FIG. 1
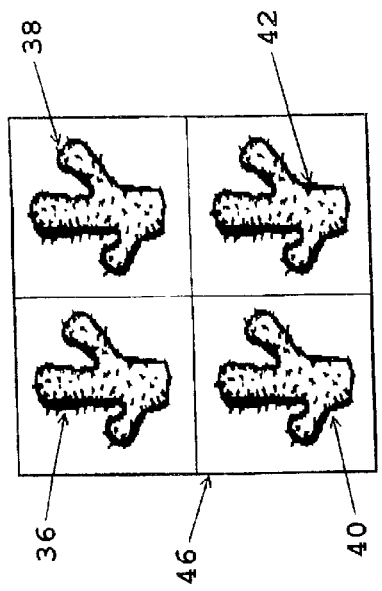
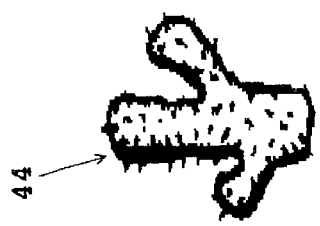
FIG. 2

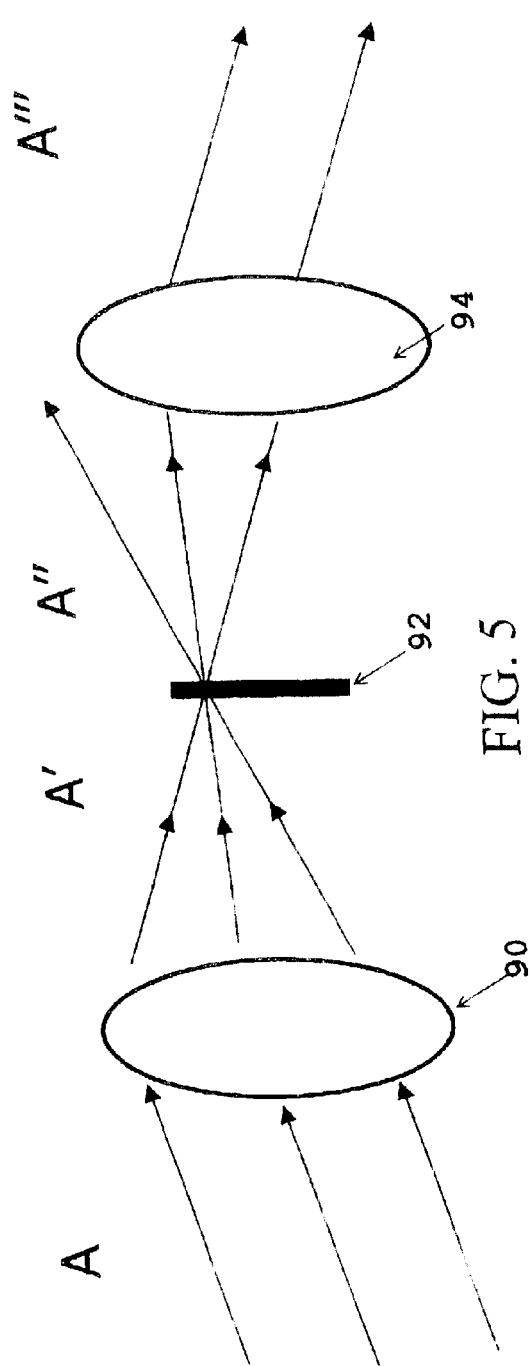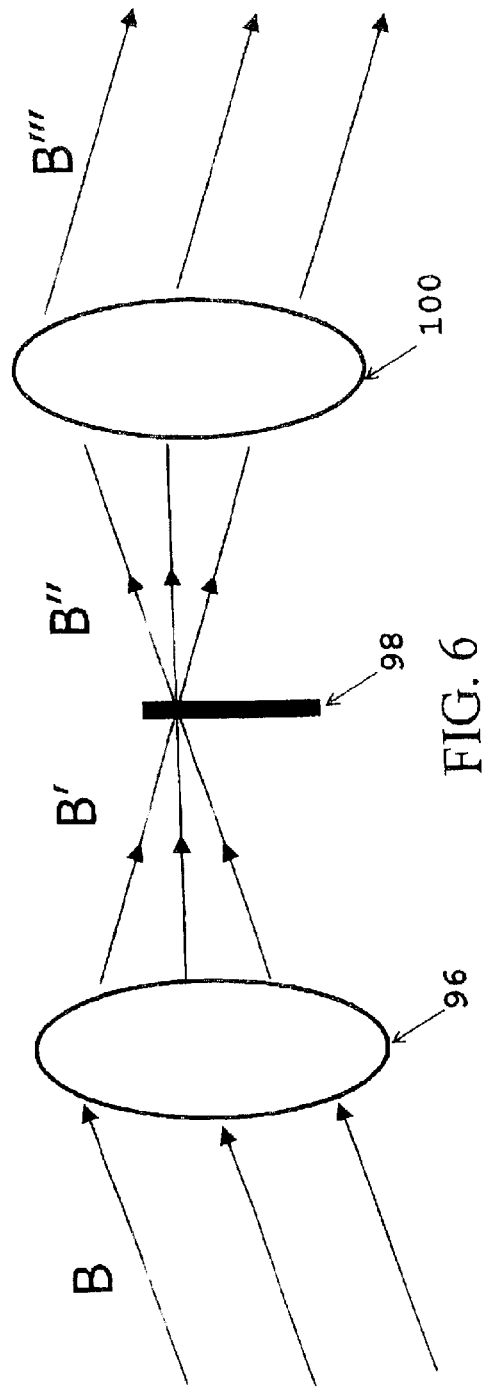

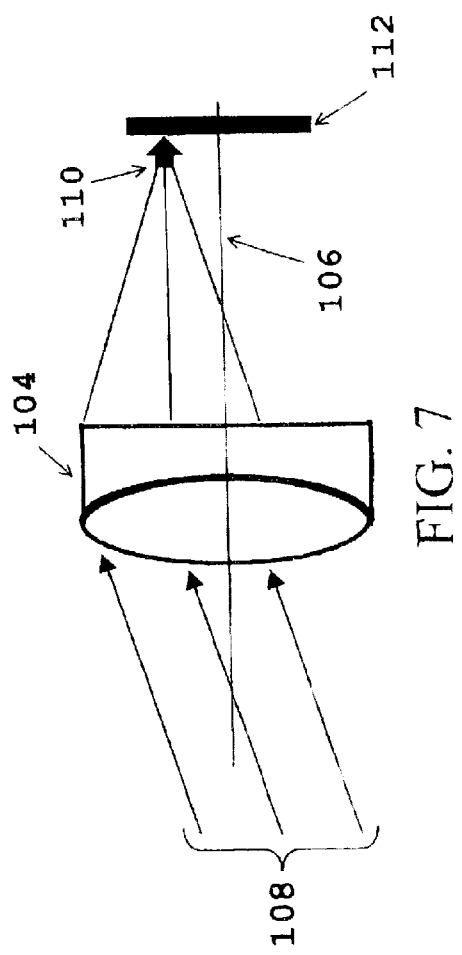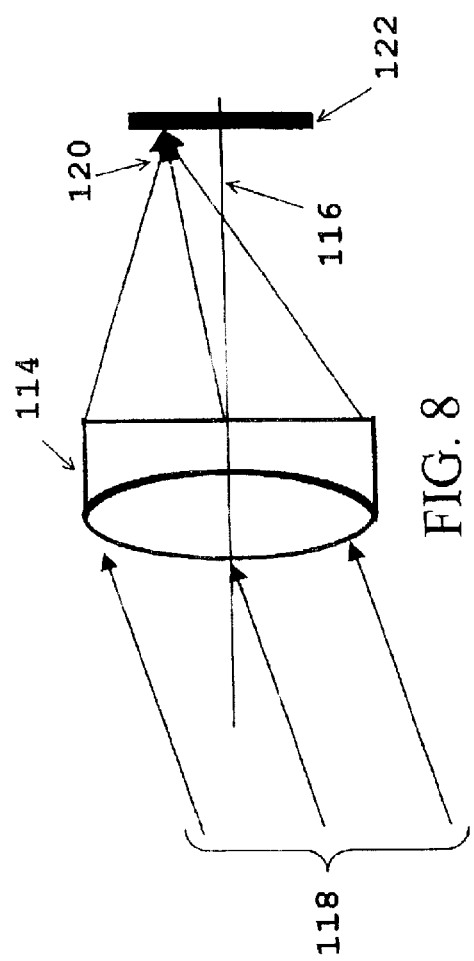

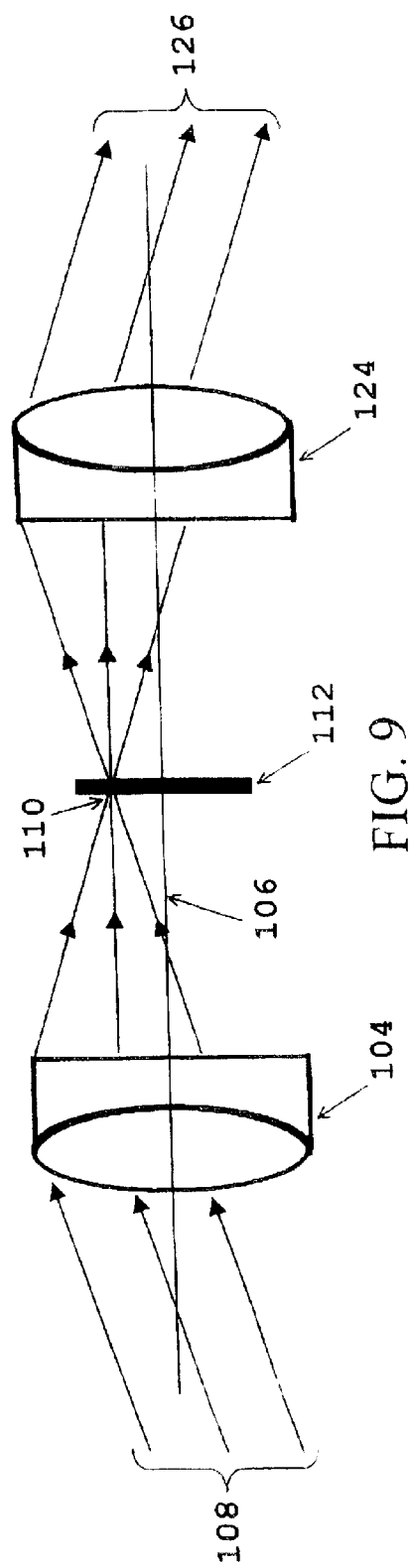
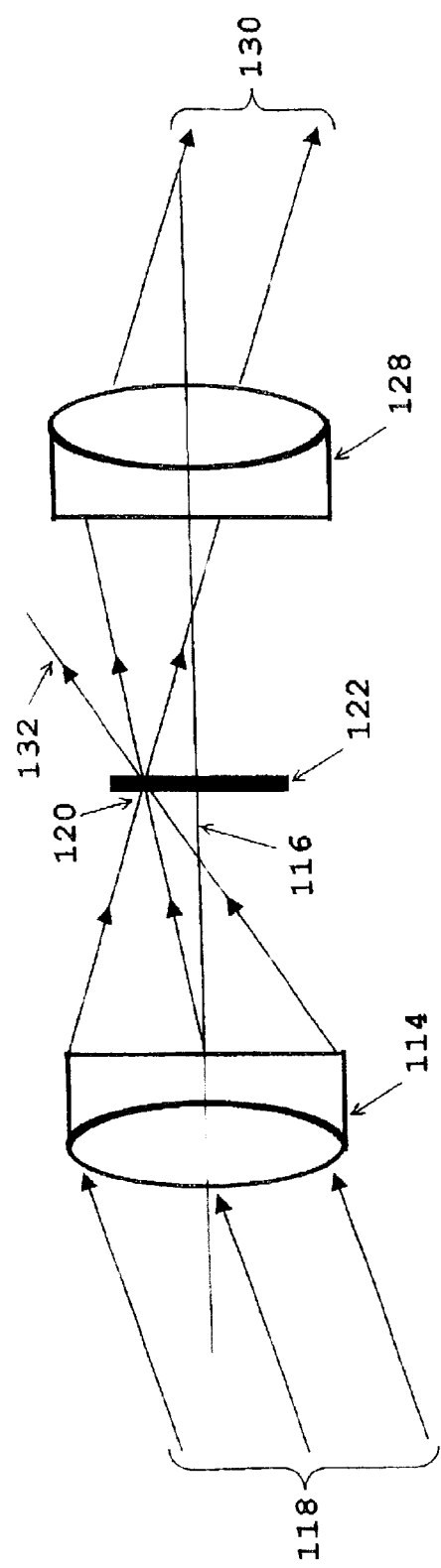
FIG. 9
FIG. 10

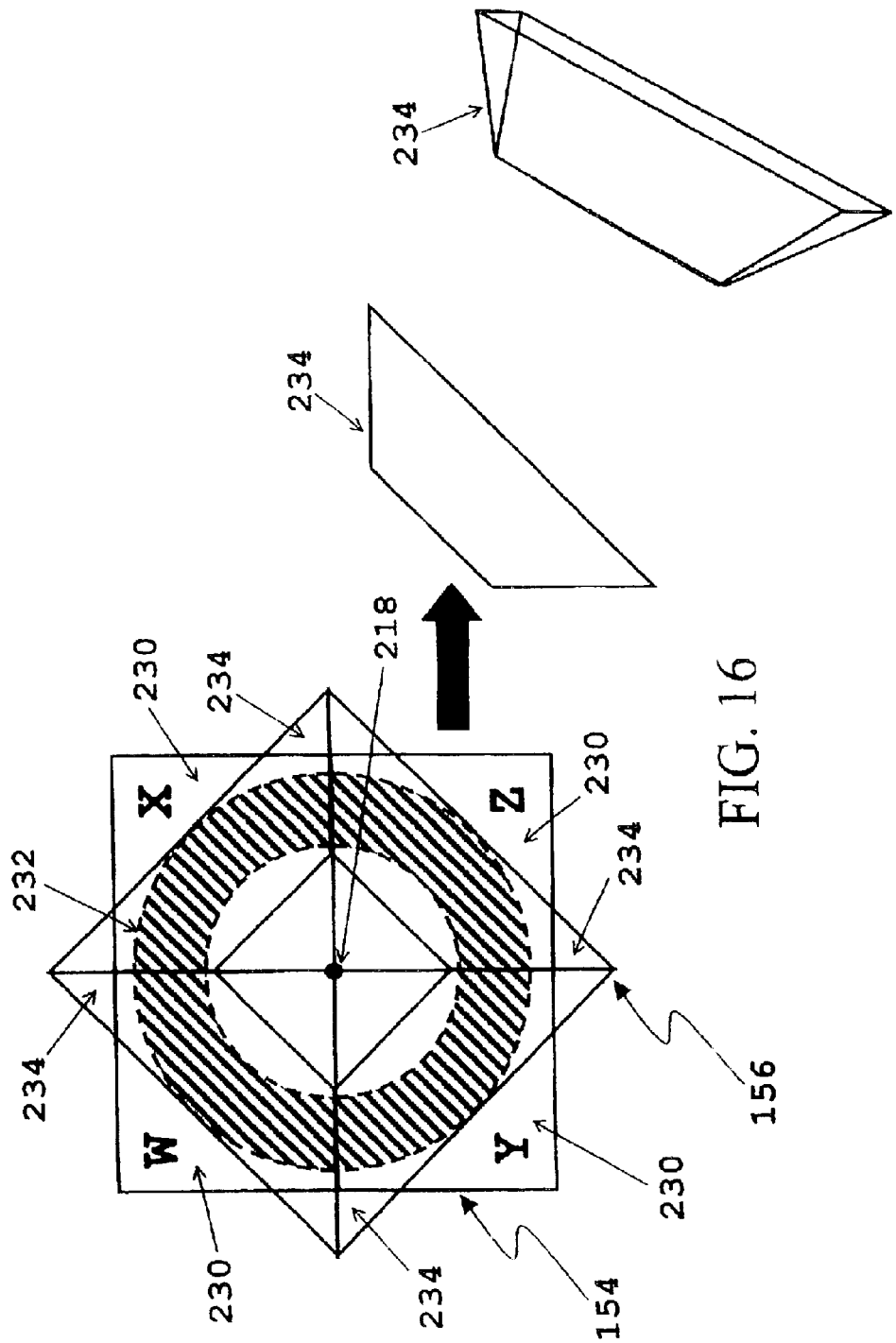

MULTIPLE IMAGING SYSTEM

CROSS REFERENCE TO RELATED APPLICATIONS

This application claims priority of U.S. Provisional Application No. 60/303,243 filed on Jul. 5, 2001, which is herein incorporated by reference.

BACKGROUND OF THE INVENTION

This invention relates generally to imaging systems and more particularly to an imaging system that produces multiple images of a single object scene onto a single detector array. These multiple images are spatially displaced from one another on a single detector array in the image plane.

In some specialized applications, such as long-range multi-spectral imaging, there is a great desire to produce several images of a given object scene simultaneously on a single detector array (such as a CCD). For applications such as multi-spectral imaging, each of these separate images is passed through a different colored filter. Presently, multi-spectral imaging is typically performed either with rotating filter wheels (which are unable to record more than a single image simultaneously) or with a plurality of imaging and detection systems (which inherently are unable to image onto a single detector array).

Multi-spectral systems that rely on rotating filter wheels produce images through various filters, one-at-a-time, and in succession. In cases where it is important to produce differently-filtered images simultaneously, filter-wheel-dependent multi-spectral systems are inadequate.

U.S. Pat. No. 5,194,959 describes a multi-spectral imaging system that produces differently-filtered images simultaneously on three different imaging sensors. One major drawback with this system is that three imaging sensors, which can often be quite expensive, are required. In addition, in cases where high-performance and/or low-contrast imaging is to be performed, it is desirable to compare images formed on a single imaging sensor. The reason for this is that every imaging sensor, no matter how similar, is different in some way than every other imaging sensor. For example, something as simple as a slight difference in temperature stability between two imaging sensors can make very fine comparisons of images made on the two imaging sensors practically impossible. For many multi-spectral applications, it is absolutely necessary to produce multiple images on a single imaging sensor.

U.S. Pat. Nos. 4,933,751, 5,024,530, 5,642,191, 5,729,011, and 5,926,283 each describe an apparatus and/or method for producing multiple images simultaneously on a single imaging sensor. All of these prior art patents have shortcomings which are directly addressed in the invention described herein.

U.S. Pat. Nos. 4,933,751 and 5,926,283 describe apparatuses that require mirror reflection of the optical beam in so-called "off-axis" or "perpendicular" directions. Because of the convoluted orientation of the multiple off-axis mirrors in these designs, complex positioning systems are required., These patents also describe apparatuses that do not to minimize vignetting.

U.S. Pat. No. 5,729,011 describes an apparatus that positions both the image-separating prism and the filter array at a point in the optical train where the light is converging. Positioning of the prism at a point in the optical train where light is converging introduces a number of aberrations and degrades image quality. Furthermore, positioning of the filter array at a point in the optical train where light is converging necessarily causes light to be incident on the filters at a wide range of angles (corresponding to the angles at which the light is converging). It is well-known in the field of interference filters that filters' spectral transmission properties vary greatly with angle. Furthermore, this apparatus does not minimize vignetting.

U.S. Pat. No. 5,642,191 describes an apparatus that positions the filter at a point in the optical train where the light is converging. This presents the same shortfalls presented in the case where a filter array is placed in a converging beam. Furthermore, splitting of the image into only two images is anticipated, and means are not shown for the more complex case where four or more images are to be produced. Furthermore a system of two, concentrically located prisms is required, which is more complicated to align than a single prism would be.

U.S. Pat. No. 5,024,530 describes an apparatus that does not prevent light from each of the multiple images from spilling over into neighboring images. Furthermore, splitting of the image into only two images is anticipated, and means are not shown for the more complex case where four or more images are to be produced.

It is therefore an object of this invention to produce multiple images of the same object scene simultaneously and adjoining one another on a single detector plane.

It is another object of this invention to effect such imaging with an optical system that exhibits no vignetting.

It is another object of this invention to effect such imaging with an optical system that requires no off-axis optical elements.

It is another object of this invention to effect such imaging with an optical splitting means that comprises a single refractive prism.

It is another object of this invention to effect such imaging without the use of mirrors.

It is another object of this invention to effect such imaging with an optical system that allows adjustment of the size of each image constituting the multiple images.

It is another object of this invention to effect such imaging with an optical system that allows adjustment of orientation and placement of the multiple images.

SUMMARY OF THE INVENTION

The objects set forth above as well as further and other objects and advantages of the present invention are accomplished by the embodiments of the invention described herein below.

The present invention uses a series of optical elements to produce multiple simultaneous adjoining images on a single image plane. A first, intermediate, image is produced using the first telecentric imaging lens. This intermediate image is produced at a plane coincident with an adjustable-size rectangular field stop. The rectangular field stop is mounted in a sub-housing that allows its free rotation. A second telecentric lens collimates the light from the intermediate image. This collimated light is next passed through an optical splitting means, which uses the principal of refraction to separate the light into multiple components. The optical splitting means is mounted in a sub-housing that allows its free rotation. From here, the light next passes through a third and final lens, which produces a second, final, image on a final imaging plane. A single, planar detection device (such as film or a CCD array) is located at a plane substantially coincident with the final imaging plane.

The final image consists of a plurality of identical copies of the intermediate image, each of which may be composed of a different component, or set of components, of the original incident light. The plurality of identical copies of the intermediate image may be arranged such that their edges are adjoining or nearly-adjoining. Size of the multiple identical copies of the intermediate image may be adjusted by adjusting the size of the rectangular field stop. Orientation of the multiple identical copies of the intermediate image may be adjusted by adjusting the rotation of the rectangular field stop. Placement of the multiple identical copies of the intermediate image on the final imaging plane may be adjusted by adjusting the rotation of the optical splitting means.

For a better understanding of the present invention, together with other and further objects thereof, reference is made to the accompanying drawings and detailed description.

BRIEF DESCRIPTION OF THE DRAWINGS

FIG. 1 is a schematic illustration of the components of the present invention.

FIG. 2 is a schematic illustration depicting the concept of forming a plurality of nearly-identical images on a single imaging plane.

FIG. 5 is a schematic illustration of the present invention depicting the concept of a vignetting optical system.

FIG. 6 is a schematic illustration of the present invention depicting the concept of a non-vignetting optical system.

FIG. 7 is a schematic illustration of the present invention depicting the concept of telecentric imaging.

FIG. 8 is a schematic illustration of the present invention depicting the concept of non-telecentric imaging.

FIG. 9 is a schematic illustration of the present invention depicting a telecentric imager and telecentric collimator.

FIG. 10 is a schematic illustration of the present invention depicting a non-telecentric imager and non-telecentric collimator.

FIG. 16 is a schematic illustration of the present invention of a second preferred embodiment of a filter plane with a second preferred embodiment of a beam-separating prism plane shown overlaid.

FIG. 17 is a pictorial illustration of a preferred embodiment of an individual wedge-prism.

DETAILED DESCRIPTION OF THE PREFERRED EMBODIMENTS

Figure 3:
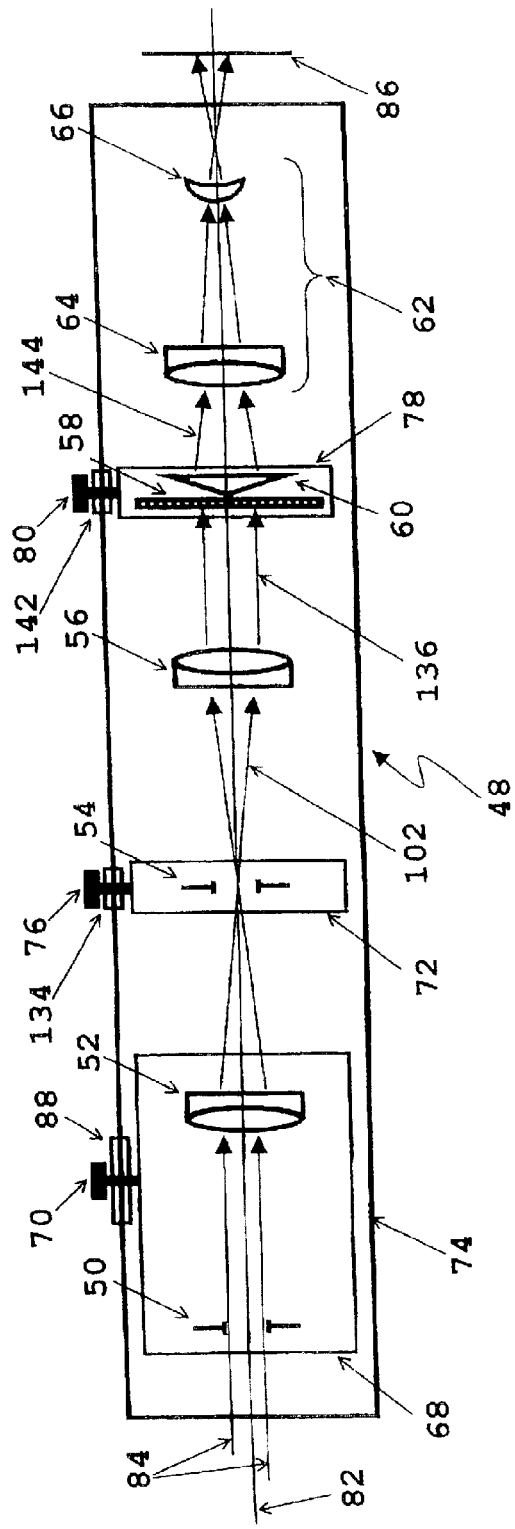
FIG. 3 is a schematic illustration of a side view of a first preferred embodiment of the present invention.

The basic concept of the present invention involves telecentrically forming a first image of a distant object, masking the edges of the first image, collimating light from the first image, filtering and then beam-separating the collimated light, and then forming a plurality of separate images on a single imaging plane. FIG. 1 shows a schematic diagram of the present invention.

Referring to FIG. 1, optical radiation 10 from a distant object (not shown) is incident on a first telecentric imaging lens 12 (also referred to as the first telecentric optical sub-system). The first telecentric imaging lens 12 focuses the optical radiation 14 and forms a first image at a plane substantially coincident with a rectangular aperture 16. After focusing to an image at a plane substantially coincident with a rectangular aperture 16, optical radiation next diverges 18 and is incident on a second telecentric imaging lens 20 (also referred to as the second telecentric optical sub-system). The second telecentric imaging lens 20 is positioned at a distance from the rectangular aperture 16 that causes the optical radiation to be substantially collimated 22 after passing through the second telecentric imaging lens 20. The collimated beam of optical radiation 22 is next incident on a beam-separating sub-system 24. The beam-separating sub-system 24 comprises a filter plane 26 and a beam-separating prism plane 28. After the collimated beam of optical radiation 22 passes through the beam-separating sub-system 24, it emerges as a plurality of collimated beams of optical radiation 30, each traveling at an angle with respect to the original direction of propagation of the collimated beam of optical radiation 22. The plurality of collimated beams of optical radiation 30 next passes through a third imaging lens 32 (also referred to as the third optical sub-system), which third imaging lens 32 forms a plurality of images on a final imaging plane 34. The plurality of images are nearly identical in form, with the only exception being that each is formed with optical radiation that has passed through a different filter in the filter plane 26.

FIG. 2 shows a schematic of the principle of forming a plurality of (four in this case) nearly identical images 36, 38, 40, and 42 of a single object 44 on a single imaging plane 46. Note that each of the plurality of images 36, 38, 40, and 42 has passed through a different filter in the filter plane 26, but is otherwise identical in form to the other images.

FIG. 3 shows a pictorial cross-section of a first preferred embodiment of the apparatus 48. The components of this first preferred embodiment 48 include an adjustable-diameter iris 50, an objective lens 52, an adjustable-size rectangular field stop 54, a collimating lens 56, a filter plane 58, a beam-separating prism 60, and a focusing lens group 62, which focusing lens group 62 comprises a focusing lens 64, and a field-flattening meniscus lens 66. The adjustable-diameter iris 50 and objective lens 52 are mounted in a sub-housing 68 by conventional means (not shown), which sub-housing 68 is held firmly in place with a locking bolt 70. The rectangular field stop 54 is mounted in a sub-housing 72 by conventional means (not shown), which sub-housing 72 is held firmly in place to the housing 74 with a locking bolt 76. The filter plane 58 and the beam-separating prism 60 are mounted in a sub-housing 78 by conventional means (not shown), which sub-housing 78 is held firmly in place to the housing 74 with a locking bolt 80. All of the components of the apparatus 48 are mounted to the housing 74 such that their centerline is coincident with an optical axis 82. All of the components of the apparatus 48 are contained within or connected to a housing 74, which in this case is made of aluminum, but may be made of any durable material such as plastic, wood, or metal.

As illustrated in FIG. 3, optical radiation 84 from a distant object (not shown) passes through the adjustable-diameter iris 50 and a series of lenses and filters to form a plurality of images on a detector plane 86. Optical radiation includes, for example, ultraviolet, visible, and near-infrared electromagnetic radiation with wavelength(s) in the range from 0.3 micron to 2 microns.

Referring again to FIG. 3, optical radiation 84 from a distant object (not shown) passes through the adjustable-diameter iris 50 (preferably by Thorlabs, part #SM1D12) and is focused by objective lens 52 (preferably by Newport, 50 mm focal length, part #PAC040) to form an intermediate, real image at a plane substantially coincident with an adjustable-size rectangular field stop 54 (preferably by Coherent, part #61-1137). The adjustable-diameter iris 50 and objective lens 52 (an embodiment of the first telecentric optical sub-system) are mounted in a sub-housing 68, which sub-housing 68 is connected with the system housing 74 in such a way that the sub-housing 68 may be moved along the optical axis 82. For example, the adjustable-diameter iris 50 and objective lens 52 may be firmly mounted in a round sub-housing 68, and the round sub-housing 68 may have attached to it a locking bolt 70, which locking bolt 70 passes through a slot 88 (illustrated in FIG. 4) in the housing 74. Provided that the slot 88 in the housing 74 is aligned parallel to the optical axis 82, and the slot 88 in the housing 74 has a width slightly larger than the width of the locking bolt 70, the sub-housing 68 will then be restricted to move only in a direction parallel to the optical axis 82. Furthermore, the locking bolt 70 is attached to the sub-housing 68 such that when the locking bolt 70 is tightened, the sub-housing 68 will be firmly attached to the housing 74 and the sub-housing 68 will then be restricted from moving along the optical axis 82. By setting the size of the adjustable iris 50 to preferably 8 mm, and by locating the adjustable iris 50 50 mm from the objective lens 52, a non-vignetting, telecentric imaging situation is obtained. A non-vignetting, telecentric imaging situation ensures that substantially all optical radiation 84 collected by the objective lens 52 will be passed without loss through the entirety of the system 48.

Vignetting is an effect occurring in some optical imaging systems that causes off-axis objects to appear dimmer than on-axis objects. As illustrated in FIG. 5, an off-axis object emits or reflects optical radiation A that passes through a non-telecentric lens 90 and is redirected as A' upon an imaging plane 92. The optical radiation A'' exits the imaging plane 92 and is directed towards a non-telecentric lens 94. Some, but not all, of the optical radiation A'' is passed through the system as denoted by rays A'''. Because some of the rays A do not pass through lens 94, passage of the rays A through the system is impeded and the total amount of optical radiation through the system is lessened, and therefore the system is said to suffer from vignetting.

FIG. 6 shows an example of an off-axis object emitting or reflecting optical radiation B that passes through a telecentric lens 96 and is redirected as B' upon an imaging plane 98. The optical radiation B'' exits the imaging plane 98 and is directed towards a telecentric lens 100. All of the optical radiation B'' is passed through the system as denoted by rays B'''. Because the passage of all of the rays B through the system is not impeded, the total amount of optical radiation through the system is conserved and the system is said to not suffer from vignetting.

As illustrated in FIG. 3, the adjustable-diameter iris 50 is located at a position ahead of the objective lens 52. The distance between the iris 50 and the objective lens 52 is substantially equivalent to the focal length of the objective lens 52. Locating the iris 50 at this position ensures telecentricity (to be discussed in detail below) of the objective lens 52 in image space. As illustrated in FIG. 3, an intermediate image of the distant object is formed by the objective lens 52 at a plane substantially coincident with an adjustable-size rectangular field stop 54. Because of the image-space telecentricity of the objective lens 52, optical radiation 102 emerges from the adjustable-size rectangular field stop 54 in a telecentric manner ensuring that vignetting (to be discussed in detail below) of the image is minimized.

FIG. 7, FIG. 8, FIG. 9, and FIG. 10 are provided herein to aid in the explanation of the processes of vignetting and telecentric systems. FIG. 7 shows a schematic diagram of the action of a telecentric imaging lens 104 aligned along an optical axis 106. Incoming optical radiation 108 from a distant off-axis source (not shown) is focused to an image 110 by the telecentric imaging lens 104 to an imaging plane 112.

FIG. 8 shows a schematic diagram of the action of a non-telecentric imaging lens 114 aligned along an optical axis 116. Incoming optical radiation 118 from a distant off-axis source (not shown) is focused to an image 120 by the non-telecentric imaging lens 114 to an imaging plane 122. Note the difference in angles between the focused rays 110 emerging from the telecentric imaging lens 104 of FIG. 7 and the focused rays 120 emerging from the non-telecentric imaging lens 114 of FIG. 8.

FIG. 9 shows a schematic diagram of the telecentric imaging lens 104 and imaging plane 112, wherein rays of optical radiation 110 converging on the imaging plane 112 are further collimated with the use of a second telecentric collimating lens 124. Rays of optical radiation 126 exit the telecentric collimating lens 124. Because the objective lens 104 and collimating lens 124 are both telecentric, and are designed and matched so as to co-act telecentrically together, all incident rays of optical radiation 108 are passed through the system and emerge unimpeded as-optical radiation rays 126, and therefore the system does not suffer from vignetting.

FIG. 10 shows a schematic diagram of a non-telecentric imaging lens 114 and imaging plane 122, wherein rays of optical radiation converging on the imaging plane 122 are further collimated with the use of a second non-telecentric collimating lens 128. Rays of optical radiation 130 exit the second non-telecentric collimating lens 128. Because the objective lens 114 and collimating lens 128 are not telecentric, and are not designed and matched so as to co-act telecentrically together, a significant portion of the incident rays of optical radiation 118 are prevented from emerging 130 from the system. Because the passage of some of the rays 132 through the system is impeded, the total amount of optical radiation through the system is lessened, compared to the telecentric-lens-case presented in FIG. 9, and the system is said to suffer from vignetting.

Figure 4:
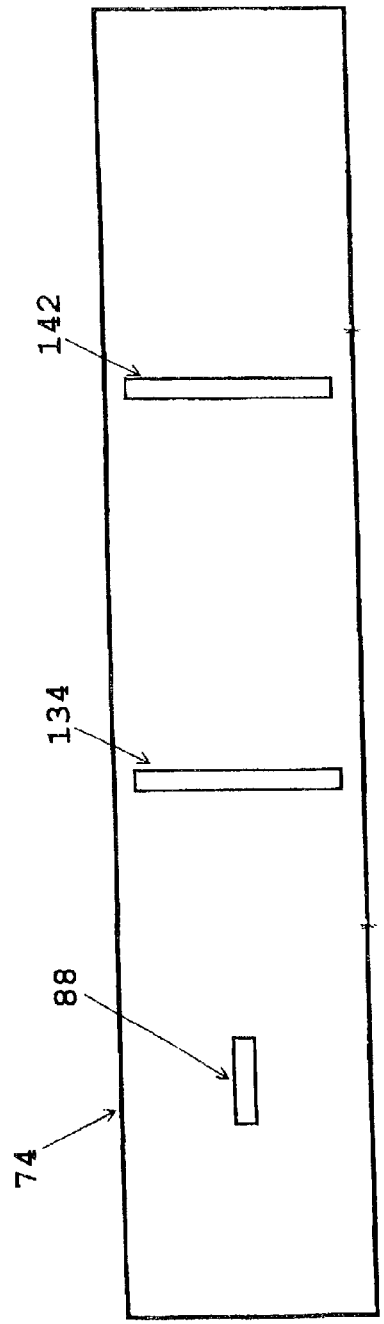
FIG. 4 is a schematic illustration of a top view of a first preferred embodiment of the present invention.

Returning to FIG. 3, collimating lens 56 receives diverging optical radiation 102 from the intermediate image, which image having been formed by objective lens 52 at a plane substantially coincident with the rectangular field stop 54, and produces a collimated beam of optical radiation 136. The size of the rectangular field stop 54 may be adjusted. Furthermore, the rectangular field stop 54 is mounted in a sub-housing 72, which sub-housing 72 is connected with the system housing 74 in such a way that the sub-housing 72 may be rotated by conventional means (not shown) about the optical axis 82. For example, the rectangular field stop 54 may be firmly mounted in a round sub-housing 72, and the round sub-housing 72 may be fitted into a round groove 134 in the system housing 74 (as shown in FIG. 4). In this way, the sub-housing 72 is free to rotate about the optical axis 82 within the groove 134 in the housing 74, but is restricted from any other motion. Furthermore, a locking bolt 76 is attached to the sub-housing 72 such that when the locking bolt 76 is tightened, the sub-housing 72 will be firmly attached to the housing 74 and the sub-housing 72 will then be restricted from rotating about the optical axis 82.

Figure 11:
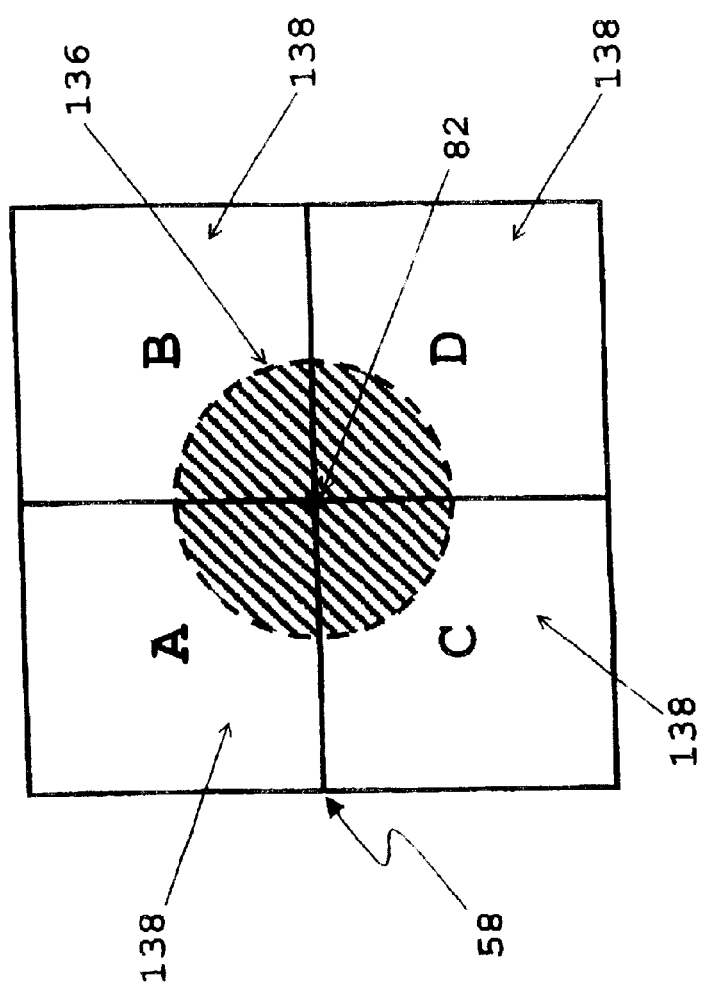
FIG. 11 is a schematic illustration of the present invention of a preferred embodiment of a filter plane.

Collimated optical radiation 136 next strikes the filter plane 58. As shown in FIG. 11, the filter plane 58 is itself comprised of a plurality of optical filters 138 (four in this case). The filters 138 may be of any type, including but not necessarily limited to, wavelength-selective bandpass filters, polarization filters, or neutral density filters. As shown in FIG. 11, the beam of collimated optical radiation 136, which beam 136 is incident on the filter plane 58, has a cross-sectional shape that is substantially round. As the beam of collimated optical radiation 136 passes through the filter plane 58, each of a plurality of (four in this case) separate portions (to be discussed in detail below) of the collimated beam 136 passes through one of a plurality of (four in this case) filters 138.

FIG. 11 shows a cross-sectional schematic diagram of the plurality of (four in this case) filters 138 that comprise the filter plane 58. Note that the cross-sectional area of the collimated beam of optical radiation 136 is substantially circular in shape, and is centered on the optical axis 82, as it passes through the filter plane 58. Note that the top-left quadrant of the collimated beam of optical radiation 136 passes through filter A, the top-right quadrant of the collimated beam of optical radiation 136 passes through filter B, the bottom-left quadrant of the collimated beam of optical radiation 136 passes through filter C, and the bottom-right quadrant of the collimated beam of optical radiation 136 passes through filter D. Immediately after passing through filter plane 58, the beam of collimated optical radiation 136 next passes through the beam-separating prism 60. The beam-separating prism 60 is an optical element, or an arrangement of a plurality of optical elements, with a plurality of (four in this case) facets on one side, and a single flat facet on the other side. For the present preferred embodiment, the beam-separating prism 60 is preferably a single optical element made of BK7 glass, but any transmitting, refracting material (such as plastic, water, or other types of glass) may be used. For the present preferred embodiment, the multi-faceted side of the beam-separating prism 60 preferably has four identical facets, each with a wedge angle of 8.92 degrees. The beam-separating prism 60 causes the four quadrants of the beam of collimated optical radiation, each of which has passed through a different filter 138 in the filter plane 58, to bend in toward the optical axis 82.

Figure 12:
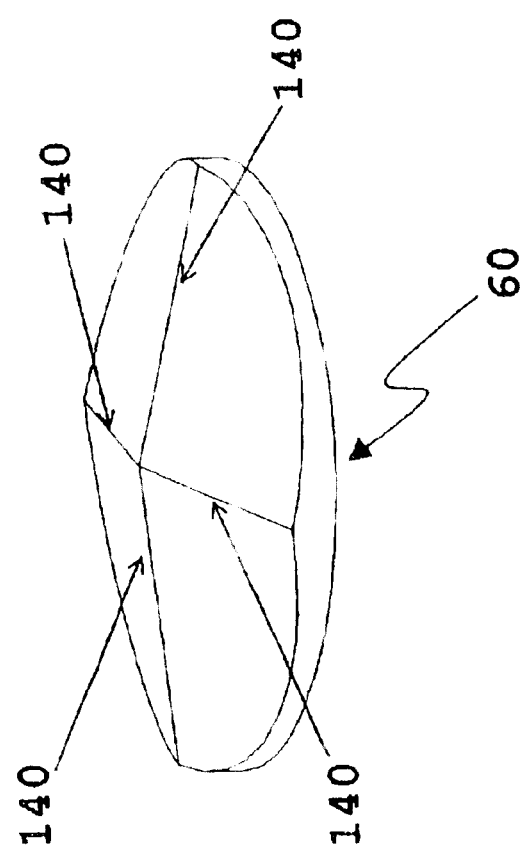
FIG. 12 is a pictorial illustration of a preferred embodiment of a beam-separating prism.
Figure 13:
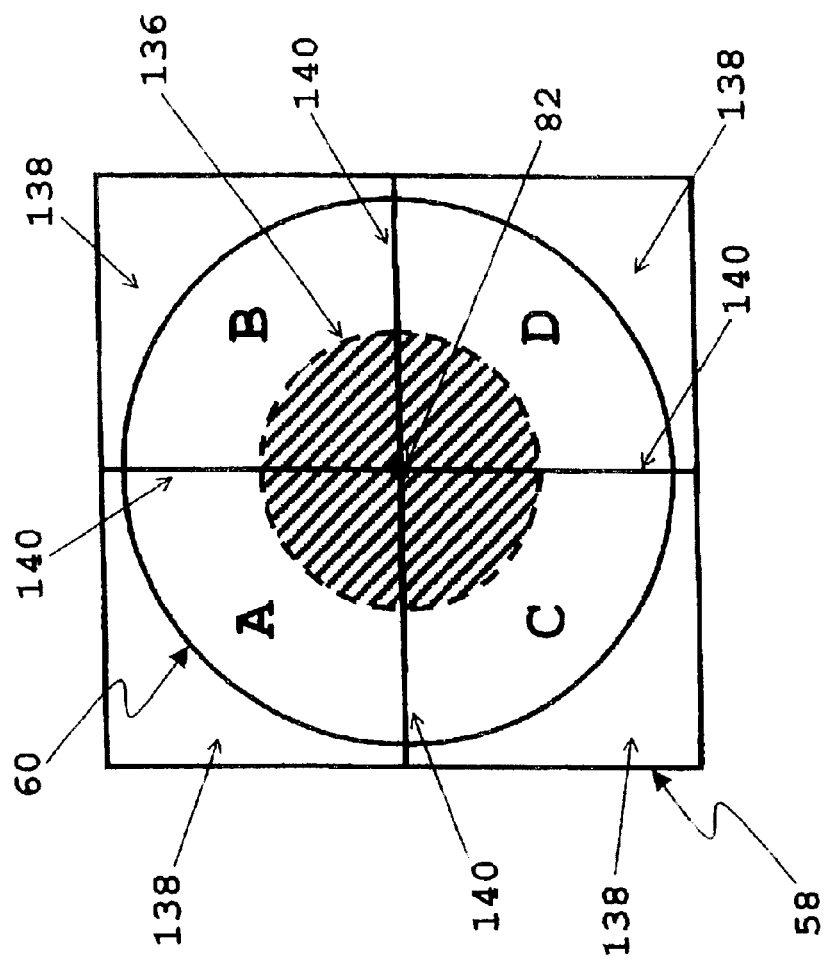
FIG. 13 is a schematic illustration of the present invention of a preferred embodiment of a filter plane with a preferred embodiment of a beam-separating prism shown overlaid.

FIG. 12 shows a drawing of the beam-separating prism 60, and clearly shows the vertices 140 of the beam-separating prism 60, which vertices 78 separate the multiple sections (four in this case) of the prism 60. FIG. 13 shows a cross-sectional schematic diagram of the plurality of (four in this case) filters 138 that comprise the filter plane 58, superimposed in front of the beam-separating prism 60. Note that the cross-sectional area of the collimated beam of optical radiation 136 is substantially circular in shape, and is centered on the optical axis 82, as it passes through the beam-separating prism 60. As shown in FIG. 13, each of the vertices 140 of the beam-separating prism 60 is aligned so that it is substantially parallel with each of the corresponding interfaces between the individual filters 138 (which filters are labeled A, B, C, and D in FIG. 13) that comprise the filter plane 58.

Returning to FIG. 3, the filter plane 58 and the beam-separating prism 60 are mounted in a sub-housing 78, which sub-housing 78 is connected with the system housing 74 in such a way that the sub-housing 78 may be rotated about the optical axis 82. For example, the filter plane 58, which filter plane 58 comprises a plurality of separate filters 138, and the beam-separating prism 60 may be firmly mounted in a round sub-housing 78, and the round sub-housing 78 may be fitted into a round groove 142 in the system housing 74 (as shown in FIG. 4). In this way, the sub-housing 78 is free to rotate about the optical axis 82 within the groove 142 in the housing 74, but is restricted from any other motion. Furthermore, a locking bolt 80 is attached to the sub-housing 78 such that when the locking bolt 80 is tightened, the sub-housing 78 will be firmly attached to the housing 74 and the sub-housing 78 will then be restricted from rotating about the optical axis 82.

After the beam of collimated optical radiation 136 has passed through the beam-separating prism 60, it next passes through the final imaging lens group 62. After the beam of collimated optical radiation 136 has passed through the beam separating prism 60, the beam of collimated optical radiation 136 effectively becomes a plurality of (four in this case) differently-directed collimated beams of optical radiation 144. With this plurality of (four in this case) differently-directed collimated beams of optical radiation 144, the final imaging lens group 62 is used to form a plurality of (four in this case) images on the detector plane 86 (preferably a CCD detector, such as by Pulnix, part #TM1040). Imaging lens group 62 preferably comprises an achromatic doublet 64 (manufactured by Newport, part #PAC040) and a field-flattening meniscus lens 66 (preferably made of BK7 glass, preferably having a center thickness of 2.3 mm, preferably having a convex radius of curvature of 12.49 mm, preferably having a concave radius of curvature of 29.54 mm, and preferably having a diameter of 12.7 mm).

The method of operation for this embodiment involves simply aiming the optical system at a reflecting or emitting source of optical radiation. Adjustment of the size of each of the plurality of (four in this case) images is effected through the adjustment of the size of the rectangular field-stop 54. Adjustment of the orientation of the plurality of (four in this case) images on the CCD detector 86 is effected through rotation about the optic axis 82 of the rectangular field-stop 54, which field stop 54 is mounted in a rotatable sub-housing 72 with a locking bolt 76 provided for just this purpose. Adjustment to the placement of the plurality of (four in this case) images on the CCD detector 86 is effected through rotation about the optic axis 82 of the filter plane 58 and beam-separating prism 60, which filter plane 58 and prism 60 are mounted in a rotatable sub-housing 78 with a locking bolt 80 provided for just this purpose. Focus of the images is effected through movement of objective lens 52 in a direction, along the optical axis 82, towards or away from the rectangular field-stop 54. Ultimately, the electronic signal from the CCD detector 86 must be collected and then used to create a display elsewhere (such as on a display monitor, or in a computer's memory). The present invention concerns only creating multiple images on a single imaging plane. Methods for displaying and/or processing the multiple images are outside the scope of the present invention.

Figure 14:
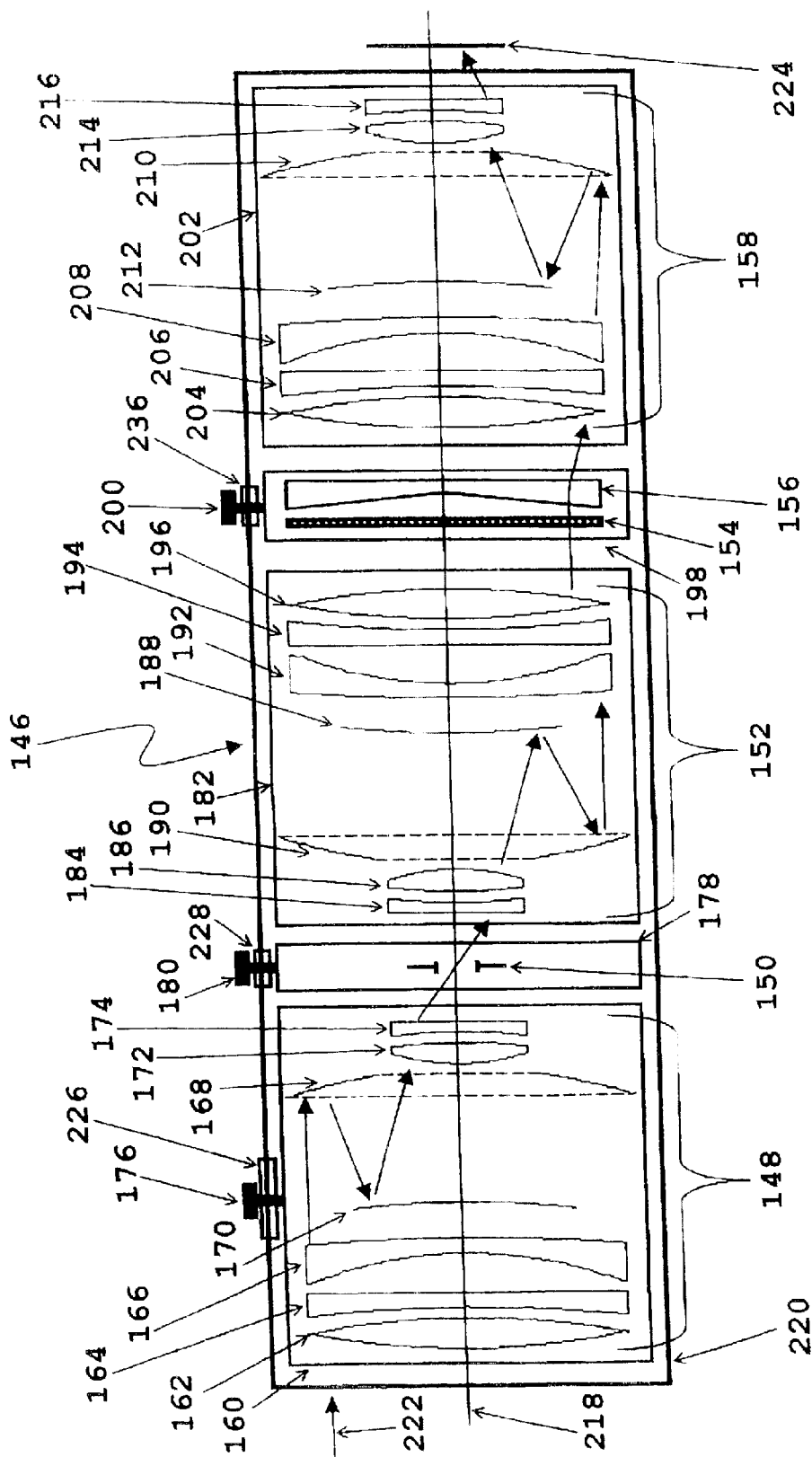
FIG. 14 is schematic illustration of the present invention of a second preferred embodiment of the invention.

FIG. 14 shows a pictorial cross-section of a second preferred embodiment 146 of the apparatus. The components of this second preferred embodiment 146 include an objective lens 148, an adjustable-size rectangular field stop 150, a collimating lens 152, a filter plane 154, a beam-separating prism plane 156, and a focusing lens 158. The objective lens 148 in this second preferred embodiment 146 is a compound lens, and therefore comprises a plurality of (seven in this case) optical elements, which optical elements are mounted in a single sub-housing 160. Optical elements mounted in the sub-housing 160 preferably include a first lens element 162, a second lens element 164, a third lens element 166, a primary mirror 168, a secondary mirror 170, a fourth lens element 172, and a fifth lens element 174. The sub-housing 160 is held firmly in place with a locking bolt 176. The rectangular field stop 150 is mounted in a sub-housing 178, which sub-housing 178 is held firmly in place with a locking bolt 180. The collimating lens 152 in this second preferred embodiment 146 is a compound lens, and therefore comprises a plurality of (seven in this case) optical elements, which optical elements are mounted in a single sub-housing 182. Optical elements mounted in the sub-housing 182 preferably include a first lens element 184, a second lens element 186, a first mirror 188, a second mirror 190, a third lens element 192, a fourth lens element 194, and a fifth lens element 196. The filter plane 154 and beam-separating prism plane 156 are mounted in a sub-housing 198, which sub-housing 198 is held firmly in place with a locking bolt 200. The focusing lens 158 in this second preferred embodiment 146 is a compound lens, and therefore comprises a plurality of (seven in this case) optical elements, which optical elements are mounted in a single sub-housing 202. Optical elements mounted in the sub-housing 202 preferably include a first lens element 204, a second lens element 206, a third lens element 208, a primary mirror 210, a secondary mirror 212, a fourth lens element 214, and a fifth lens element 216. All of the components of the apparatus 146 are mounted along an optical axis 218 and are contained within or connected to a housing 220, which in this case is made of aluminum, but may be made of any durable material such as plastic, wood, or metal.

As illustrated in FIG. 14, a single beam of optical radiation 222 from a distant object (not shown) passes through a series of lenses and filters to form a plurality of (four in this case) images on a detector plane 224. Optical radiation includes, for example, ultraviolet, visible, and near-infrared electromagnetic radiation with wavelength(s) in the range from 0.3 micron to 2 microns. As illustrated with arrows in FIG. 14, the order in which optical radiation 222 passes through the optical elements is as follows. First, optical radiation 222 passes through the first lens element 162, then the second lens element 164, and then the third lens element 166 of the objective lens 148. Next, optical radiation is reflected from the primary mirror 168 and then the secondary mirror 170 of the objective lens 148. Next, optical radiation passes through the fourth lens element 172 and then the fifth lens element 174 of the objective lens 148. Optical radiation next passes through the rectangular aperture 150, and then it passes through the first lens element 184 and then the second lens element 186 of the collimating lens 152. Next optical radiation reflects from the first mirror 188 and then the second mirror 190 of the collimating lens 152. Next optical radiation passes through the third lens element 192, then the fourth lens element 194, and then the fifth lens element 196 of the collimating lens 152. Next, optical radiation passes through the filter plane 154 and then the beam-separating prism plane 156. Note that the order of placement of the two beam-separating elements, namely the filter plane 154 and the beam-separating prism plane 156, may be reversed without affecting the principle of the present invention. Next, optical radiation passes through the first lens element 204, then the second lens element 206, and then the third lens element 208 of the focusing lens 158. Next, optical radiation is reflected from the primary mirror 210 and then the secondary mirror 212 of the focusing lens 158. Next, optical radiation passes through the fourth lens element 214 and then the fifth lens element 216 of the focusing lens 158. Optical radiation finally exits the housing 220 of the apparatus 146 and forms a plurality of (four in this case) images on the detector plane 224.

Referring again to FIG. 14, optical radiation 222 from a distant object (not shown) is focused by the objective lens 148 to form an intermediate, real image at a plane substantially coincident with an adjustable-size rectangular field stop 150 (preferably by Coherent, part #61-1137). The objective lens 148 comprises a plurality of (seven in this case) optical elements, which optical elements are mounted in a single sub-housing 160, which sub-housing 160 is connected with the system housing 220 in such a way that the sub-housing 160 may be moved along the optical axis 218. For example, the objective lens 148 may be firmly mounted in a round sub-housing 160, and the round sub-housing 160 may have attached to it a locking bolt 176, which locking bolt 176 passes through a slot 226 in the housing 220. Provided that the slot 226 in the housing 220 is aligned parallel to the optical axis 218, and the slot 226 in the housing 220 has a width slightly larger than the width of the locking bolt 176, the sub-housing 160 will then be restricted to move only in a direction along the optical axis 218. In this way, the sub-housing 160 is free to move along the optical axis 218, but is restricted from any other motion. Furthermore, the locking bolt 176 is attached to the sub-housing 160 such that when the locking bolt 176 is tightened, the sub-housing 160 will be firmly attached to the housing 220 and the sub-housing 160 will then be restricted from moving along the optical axis 218. By carefully designing the objective lens 148 so that the exit pupil is located a very large distance to the left of the objective lens (a well-understood practice in the art of optical design), a non-vignetting, telecentric imaging situation may be obtained. As explained previously, a non-vignetting, telecentric imaging situation ensures that substantially all optical radiation collected by the objective lens 148 will be passed without loss through the entirety of the system 146.

Because of the image-space telecentricity of the objective lens 148, optical radiation emerges from the adjustable-size rectangular field stop 150 in a telecentric manner (this ensures that vignetting of the image is substantially eliminated).

Referring again to FIG. 14, collimating lens 152 collimates the optical radiation from the intermediate image, which intermediate image having been formed by objective lens 148 at a plane substantially coincident with the rectangular field stop 150. The size of the rectangular field stop 150 may be adjusted. Furthermore, the rectangular field stop 150 is mounted in a sub-housing 178, which sub-housing 178 is connected with the system housing 220 in such a way that the sub-housing 178 may be rotated about the optical axis 218. For example, the rectangular field stop 150 may be firmly mounted in a round sub-housing 178, and the round sub-housing 178 may be fitted into a round groove 228 in the system housing 220. In this way, the sub-housing 178 is free to rotate about the optical axis 218 within the groove 228 in the housing 220, but is restricted from any other motion. Furthermore, a locking bolt 180 is attached to the sub-housing 178 such that when the locking bolt 180 is tightened, the sub-housing 178 will be firmly attached to the housing 220 and the sub-housing 178 will then be restricted from rotating about the optical axis 218.

Figure 15:
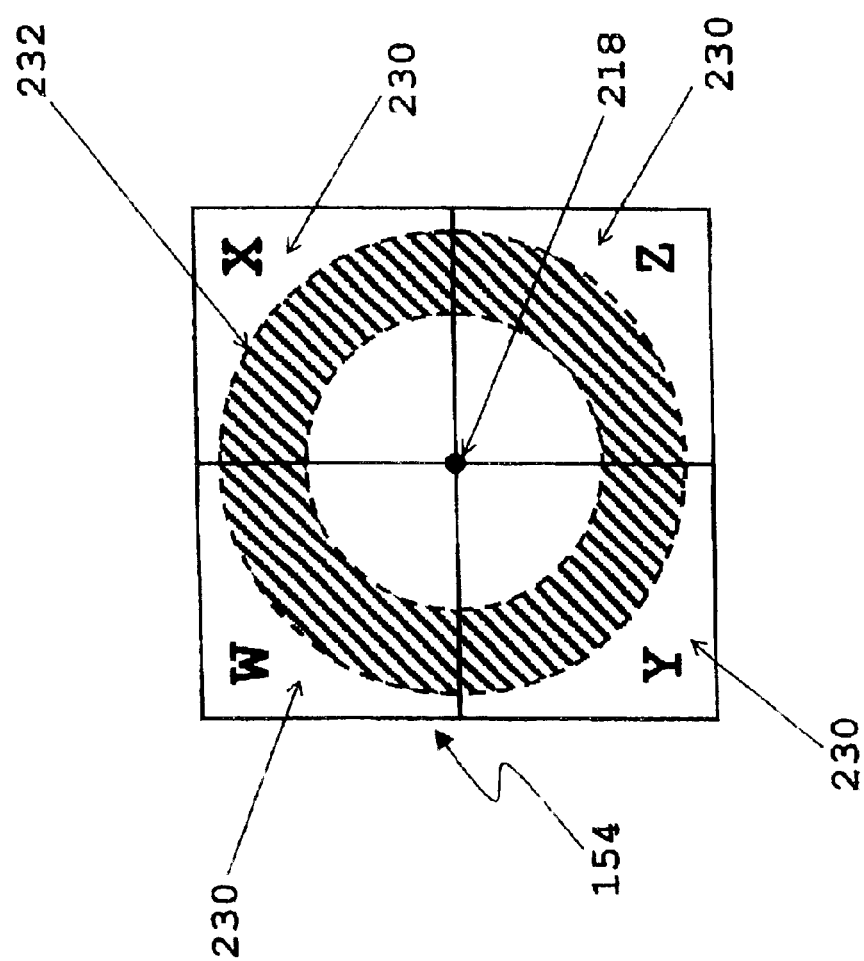
FIG. 15 is a schematic illustration of the present invention of a second preferred embodiment of a filter plane.

Collimated optical radiation next strikes the filter plane 154. As shown in FIG. 15, the filter plane 154 is itself comprised of a plurality of optical filters 230 (four in this case). The filters 230 may be of any type, including but not necessarily limited to, wavelength-selective bandpass filters, polarization filters, or neutral density filters. In one instance, for example, radiation may propagate through only one of the filters. As shown in FIG. 11, the beam of collimated optical radiation 232, which beam 232 is incident on the filter plane 154, has a cross-sectional shape that is generally round, but is confined to an area between two concentric circles, as shown in FIG. 15. As the beam of collimated optical radiation 232 passes through the filter plane 154, each of a plurality of (four in this case) separate portions of the collimated beam 232 passes through one of a plurality of (four in this case) filters 230.

FIG. 15 shows a cross-sectional schematic diagram of the plurality of (four in this case) filters 230 that comprise the filter plane 154. Also shown in FIG. 15 is a shaded circle representing the cross-sectional area of the collimated beam of optical radiation 232, as it passes through the filter plane 154. Note that the cross-sectional area of the collimated beam of optical radiation 232 is generally round, but is confined to an area between two concentric circles, as shown in FIG. 15. The reason for this is that the collimating lens 152 comprises a secondary mirror 188, which secondary mirror 188 obscures the central portion of the collimated beam 232. Note that, as depicted in FIG. 15, the top-left quadrant of the collimated beam of optical radiation 232 passes through filter W, the top-right quadrant of the collimated beam of optical radiation 232 passes through filter X, the bottom-left quadrant of the collimated beam of optical radiation 232 passes through filter Y, and the bottom-right quadrant of the collimated beam of optical radiation 232 passes through filter Z. Immediately after passing through filter plane 154, the beam of collimated optical radiation 232 next passes through the beam-separating prism plane 156.

The beam-separating prism plane 156 comprises a plurality of (four in this case) wedge-prisms 234, arranged as shown in FIG. 16. The individual wedge-prisms 234 are designed so that they are thickest toward the outermost edge of the prism plane 156 (farthest away from the optical axis 176) and they are thinnest at the innermost edge of the prism plane 156 (the innermost edge is defined here as the edge that is closest to the optical axis 218). A sketch of a single wedge-prism 234 is shown in FIG. 17. For the present preferred embodiment, the prism is preferably made of BK7 glass, but any transmitting, refracting material (such as plastic, water, or other types of glass) may be used. The beam-separating prism plane 156 causes the four quadrants of the beam of collimated optical radiation 232, each quadrant of the beam having passed through a different filter 230 in the filter plane 154, to bend or refract in a direction that is generally away from the optical axis 218.

FIG. 16 shows a drawing of the beam-separating prism plane 156, and clearly shows the plurality of (four in this case) individual wedge prisms 234 that comprise the beam-separating prism plane 156. FIG. 16 also shows a cross-sectional schematic diagram of the plurality of (four in this case) filters 230 that comprise the filter plane 154, which filter plane 154 is drawn superimposed in front of the beam-separating prism plane 156. Also shown in this figure is a shaded area representing the cross-sectional area of the collimated beam of optical radiation 232, as it passes through the filter plane 154. As shown in FIG. 16, each of the individual wedge prisms 234 comprising the beam-separating prism plane 156 is aligned so that its edges are aligned substantially parallel to the edges of the individual filters 230 (which filters are labeled W, X, Y, and Z in FIG. 16) that comprise the filter plane 154.

Returning to FIG. 14, the filter plane 154, which filter plane 154 is shown in FIG. 15 as comprising a plurality of (four in this case) separate filters 230, and the beam-separating prism plane 156, which beam-separating prism plane 156 is shown in FIG. 16 as comprising a plurality of (four in this case) individual wedge prisms 234, are mounted in a sub-housing 198, which sub-housing 198 is connected with the system housing 220 in such a way that the sub-housing 198 may be rotated about the optical axis 218. For example, the filter plane 154, which filter plane 154 comprises a plurality of (four in this case) separate filters 230, and the beam-separating prism plane 156, which beam-separating prism plane 156 comprises a plurality of (four in this case) individual wedge prisms 234, may be firmly mounted in a round sub-housing 198, and the round sub-housing 198 may be fitted into a round groove 236 in the system housing 220. In this way, the sub-housing 198 is free to rotate about the optical axis 218 within the groove 236 in the housing 220, but is restricted from any other motion. Furthermore, a locking bolt 200 is attached to the sub-housing 198 such that when the locking bolt 200 is tightened, the sub-housing 198 will be firmly attached to the housing 220 and the sub-housing 198 will then be restricted from rotating about the optical axis 218.

After the beam of collimated optical radiation has passed through the beam-separating prism plane 156, it next passes through the focusing lens 158. After the beam of collimated optical radiation has passed through the beam separating prism plane 156, the beam of collimated optical radiation effectively becomes a plurality of (four in this case) differently-directed collimated beams of optical radiation. With this plurality of (four in this case) differently-directed collimated beams of optical radiation, the focusing lens 158 is used to form a plurality of (four in this case) images on the detector plane 224 (preferably a CCD detector).

The method of operation for this embodiment involves simply aiming the optical system at a target. Adjustment of the size of each of the plurality of (four in this case) images is effected through the adjustment of the size of the rectangular field-stop 150. Adjustment of the orientation of the plurality of (four in this case) images on the CCD detector 224 is effected through rotation about the optic axis 218 of the rectangular field-stop 150, which field stop 150 is mounted in a rotatable sub-housing 178 with a locking bolt 180 provided for just this purpose. Adjustment to the placement of the plurality of (four in this case) images on the CCD detector 224 is effected through rotation about the optic axis 218 of the filter plane 154 and beam-separating prism plane 156, which filter plane 154 and prism plane 156 are mounted in a rotatable sub-housing 198 with a locking bolt 200 provided for just this purpose. Focus of the images is effected through movement of objective lens 148 in a direction, along the optical axis 218, towards or away from the rectangular field-stop 150. Ultimately, the electronic signal from the CCD detector 224 must be collected and then used to create a display elsewhere (such as on a display monitor, or in a computer's memory). The present invention concerns only creating multiple images on a single imaging plane. Methods for displaying and/or processing the multiple images are outside the scope of the present invention.

Although the invention has been described with respect to various embodiments, it should be realized this invention is also capable of a wide variety of further and other embodiments within the spirit and scope of the appended claims.

What is claimed is:

1. An apparatus, for producing a plurality of images of a single object scene, comprising:

a first telecentric optical sub-system, without inclusion of a filter, said first telecentric optical sub-system including at least one refractive optical element and being capable of focusing incoming radiation from the single object scene onto a focal plane;

a field stop located at a plane substantially coincident with the focal plane of the first telecentric optical sub-system;

a second telecentric optical sub-system capable of substantially collimating radiation received from the field stop, the field stop being positioned between the first telecentric optical sub-system and the second telecentric optical sub-system;

a beam separating sub-system capable of separating into a plurality of substantially collimated beams of radiation the substantially collimated radiation received from the second telecentric optical sub-system;

a third optical sub-system capable of forming the plurality of images on an imaging plane from said plurality of substantially collimated beams of radiation received from the beam separating sub-system, the beam separating sub-system being positioned between the second telecentric optical sub-system and the third optical sub-system, the third optical sub-system being positioned between the beam separating sub-system and the imaging plane.

2. The apparatus of claim 1 further comprising a detector array located at a plane substantially coincident with the imaging plane.

3. An apparatus, for producing a plurality of images of a single object scene, comprising:

a first telecentric optical sub-system capable of focusing incoming radiation from the single object scene onto a focal plane;

a field stop located at a plane substantially coincident with the focal plane of the first telecentric optical sub-system;

a second telecentric optical sub-system capable of substantially collimating radiation received from the field stop, the field stop being positioned between the first telecentric optical sub-system and the second telecentric optical sub-system;

a beam separating sub-system comprising a filter plane and a beam-separating component, said beam separating sub-system being capable of separating into a plurality of substantially collimated beams of radiation the substantially collimated radiation received from the second telecentric optical sub-system;

a third optical sub-system capable of forming the plurality of images on an imaging plane from said plurality of substantially collimated beams of radiation received from the beam separating sub-system, the beam separating sub-system being positioned between the second telecentric optical sub-system and the third optical sub-system, the third optical sub-system being positioned between the beam separating sub-system and the imaging plane.

4. An apparatus, for producing a plurality of images of a single object scene, comprising:

a first telecentric optical sub-system including an adjustable-diameter iris and an objective lens, said first telecentric optical sub-system being capable of focusing incoming radiation from the single object scene onto a focal plane;

a field stop located at a plane substantially coincident with the focal plane of the first telecentric optical sub-system;

a second telecentric optical sub-system capable of substantially collimating radiation received from the field stop, the field stop being positioned between the first telecentric optical sub-system and the second telecentric optical sub-system;

a beam separating sub-system capable of separating into a plurality of substantially collimated beams of radiation the substantially collimated radiation received from the second telecentric optical sub-system;

a third optical sub-system capable of forming the plurality of images on an imaging plane from said plurality of substantially collimated beams of radiation received from the beam separating sub-system, the beam separating sub-system being positioned between the second telecentric optical sub-system and the third optical sub-system, the third optical sub-system being positioned between the beam separating sub-system and the imaging plane.

5. The apparatus of claim 4 wherein the adjustable-diameter iris is capable of receiving the incoming radiation from the single object scene and the objective lens is separated by a distance substantially equal to a focal length from the adjustable-diameter iris, said objective lens being capable of receiving radiation from the adjustable-diameter iris, said focal length being a characteristic of said objective lens, and a centerline of the adjustable-diameter iris and a centerline of the objective lens are substantially collinear with a predetermined optical axis.

6. The apparatus of claim 3 wherein the field stop comprises an adjustable-size rectangular field stop.

7. The apparatus of claim 3 wherein the field stop comprises a fixed-size rectangular field stop.

8. The apparatus of claim 3 wherein the second telecentric optical sub-system comprises a collimating lens.

9. The apparatus of claim 3 wherein the third optical sub-system comprises a focusing lens, and a field-flattening meniscus lens.

10. The apparatus of claim 3 further comprising:

a housing on which the first, second and third optical sub-systems, the field stop, and the beam separating sub-system are mounted; and, wherein a centerline of each of the first, second and third optical sub-systems, the field stop, and the beam separating sub-system are substantially collinear with a predetermined optical axis.

11. The apparatus of claim 10 wherein the first telecentric optical sub-system comprises a compound lens mounted in a first sub-housing.

12. The apparatus of claim 10 wherein the second telecentric optical sub-system comprises a compound lens mounted in a sub-housing.

13. The apparatus of claim 10 wherein the third optical sub-system comprises a compound lens mounted in a sub-housing.

14. The apparatus of claim 10 wherein the first telecentric optical sub-system comprises an adjustable-diameter iris and an objective lens, mounted together in a first sub-housing.

15. The apparatus of claim 10 wherein the beam separating sub-system comprises a filter plane and a beam-separating prism component, mounted together in a sub-housing.

16. The apparatus of claim 10 wherein the field stop comprises an adjustable-size rectangular field stop mounted in a sub-housing.

17. The apparatus of claim 10 wherein the field stop comprises an fixed-size rectangular field stop mounted in a sub-housing.

18. The apparatus of claim 14 wherein the first sub-housing is attached to the housing by attachment means allowing displacement of the sub-housing along an optical axis, whereby focus of the plurality of images is adjusted through varying the distance between the first telecentric optical sub-system and the field stop.

19. The apparatus of claim 18 wherein said attachment means include a securing component capable of securely attaching the first sub-housing to the housing; and, wherein the first sub-housing is securely attached to the housing after a relative position between the first telecentric optical sub-system and the field stop is selected.

20. The apparatus of claim 15 wherein the sub-housing is attached to the housing by attachment means allowing rotation of the sub-housing about an optical axis, whereby orientation of the plurality of images is adjusted.

21. The apparatus of claim 20 wherein said attachment means include a securing component capable of securely attaching the sub-housing to the housing; and, wherein the sub-housing is securely attached to the housing after an angular orientation of the sub-housing on which the beam separating sub-system is mounted is selected.

22. The apparatus of claim 3 wherein the filter plane comprises a plurality of filters.

23. The apparatus of claim 3 wherein the beam-separating component comprises a single optical element, said element comprising a plurality of facets, each of said facets from the plurality of facets oppositely located from a single flat facet, a normal to each of said facets from the plurality of facets being at a given angle with respect to a predetermined optical axis.

24. The apparatus of claim 3 wherein the beam-separating component comprises a plurality of optical elements, each element from the plurality of optical elements comprising a facet oppositely located from a flat facet, a normal to said facet oppositely located from a flat facet being at a given angle with respect to a predetermined optical axis.

25. A method for producing multiple images of a single object scene comprising the steps of:

providing, without inclusion of a filter, a focusing telecentric optical sub-system having at least one refractive optical element;

focusing incoming radiation onto a focal plane, said focusing obtained utilizing the focusing telecentric optical sub-system;

providing a field stop at a plane substantially coincident with the focal plane of the focusing telecentric optical sub-system;

collimating radiation received from the field stop, said collimation obtained utilizing a collimating telecentric optical sub-system;

separating into a plurality of substantially collimated beams of radiation the collimated radiation received from the collimating telecentric optical sub-system, the separation obtained utilizing a beam separating sub-system;

forming a plurality of images on an imaging plane from said plurality of substantially collimated beams of radiation, the formation of the images obtained utilizing another optical sub-system.

26. The method of claim 25 further comprising the step of detecting the plurality of images.

27. The method of claim 25 further comprising the step of adjusting image size for each of the plurality of images through adjusting dimensions of the field stop.

28. The method of claim 25 further comprising the step of adjusting orientation of the plurality of images through rotating about an optical axis the beam separating sub-system.

29. The method of claim 25 further comprising the step of filtering each of said plurality of substantially collimated beams of radiation.

30. A method for producing multiple images of a single object scene comprising the steps of:

focusing incoming radiation onto a focal plane, said focusing obtained utilizing a focusing telecentric optical sub-system;

providing a field stop at a plane substantially coincident with the focal plane of the focusing telecentric optical sub-system;

collimating radiation received from the field stop, said collimation obtained utilizing a collimating telecentric optical sub-system;

separating into a plurality of substantially collimated beams of radiation the collimated radiation received from the collimating telecentric optical sub-system, the separation obtained utilizing a beam separating sub-system forming a plurality of images on an imaging plane from said plurality of substantially collimated beams of radiation, the formation of the images obtained utilizing another optical sub-system; and, adjusting focus of the plurality of images through varying the distance between the focusing telecentric optical sub-system and the field stop, said distance being varied through movement of the focusing telecentric optical sub-system along a predetermined optical axis.

31. The method of claim 30 further comprising the step of detecting the plurality of images.

32. The method of claim 30 further comprising the step of adjusting image size for each of the plurality of images through adjusting dimensions of the field stop.

33. The method of claim 30 further comprising the step of adjusting orientation of the plurality of images through rotating about an optical axis the beam separating sub-system.

34. The method of claim 30 further comprising the step of filtering each of said plurality of substantially collimated beams of radiation.

35. The apparatus of claim 3 further comprising a detector array located at a plane substantially coincident with the imaging plane.

* * * * *